Jan. 3, 1961   S. F. CHUMA ET AL   2,967,229
PERCUSSION-WELDING ELECTRODES
Filed Oct. 24, 1958
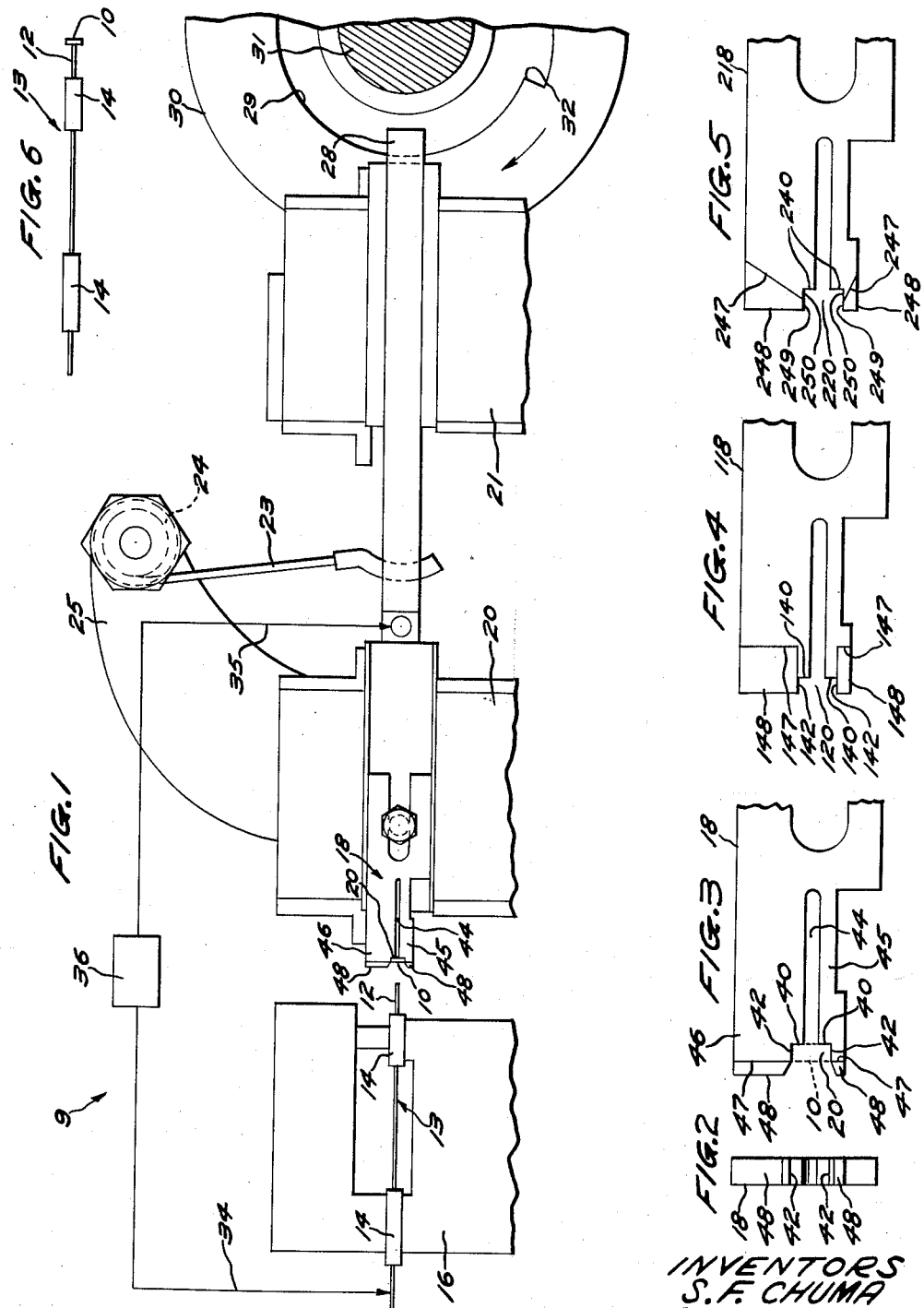
INVENTORS
S. F. CHUMA
R. C. STEEN
BY A. C. Schwarz, Jr.
ATTORNEY

United States Patent Office 2,967,229
Patented Jan. 3, 1961

2,967,229

PERCUSSION-WELDING ELECTRODES

Steve F. Chuma, Downey, Calif., and Richard C. Steen, La Grange, Ill., assignors to Western Electric Company, Incorporated, New York, N.Y., a corporation of New York Filed Oct. 24, 1958, Ser. No. 769,385

3 Claims. (Cl. 219—119)

This invention relates to percussion-welding electrodes and more particularly to an electrode in a percussion-welding apparatus for carrying a part into percussive engagement with another part to effect a weld therebetween and having a dielectric shield on the end thereof for preventing arcing to the electrode.

In the percussive welding of contacts onto the ends of wires of wire spring relays, a contact is carried by a moving electrode into percussive engagement with a wire, and as the contact moves into close proximity to the wire, a source of high voltage connected to the wire and the contact forms an arc therebetween to fuse adjacent surfaces of the contact and the wire and to weld them together. When the wire is improperly positioned relative to the contact during the welding operation, an arc is drawn between the wire and the electrode. This is highly objectionable in that the electrode is damaged thereby and its useful life is shortened.

An object of the invention is to provide an improved percussion-welding electrode.

Another object of the invention is the provision of a movable electrode for establishing electrical contact with a part and moving the part into engagement with another part to which it is to be welded by means of an arc drawn between the parts and having protective dielectric means on the end thereof to prevent arcing to the electrode during the welding operation.

A device illustrating certain aspects of the invention may include a metal electrode having a pair of protective elements of dielectric material secured to the end thereof, the dielectric elements and the electrode being shaped to form a notch for releasably holding a part to be welded in electrical contact with electrodes and the protective elements serving to prevent arcing to the electrode during the welding operation.

Other objects and advantages of the invention will become apparent by reference to the following detailed description thereof and the accompanying drawings illustrating several embodiments of the invention wherein, Fig. 1 is a fragmentary side view of a percussion-welding apparatus showing the improved electrode therein;

Figs. 2 and 3 are enlarged end and fragmentary side elevational views, respectively, of the electrode shown in Fig. 1;

Figs. 4 and 5 are fragmentary side elevational views of modified embodiments of the electrodes; and Fig. 6 is a side elevational view of a wire spring relay component with a contact bonded thereto of the type adapted to be welded with the present electrode.

Referring to the drawings, with the percussion-welding apparatus 9 shown in Fig. 1, contacts 10 (Fig. 6) are welded onto the ends of wires 12 of wire spring relay components 13 having blocks 14 of molded dielectric material in which the wires 12 are imbedded. The relay components 13 are releasably clamped in a holder 16 of the apparatus with the end of the wire 12 in the path of travel of a movable electrode 18 which has a notch 20 (Fig. 3) formed in its forward end for receiving a contact 10 and carrying it into percussive engagement with the wire 12.

The electrode 18 is slidably mounted in guideways in supporting members 20 and 21 of the apparatus and is urged toward the holder 16 by an end portion 23 of a torsion spring 24 mounted on a bracket 25 of the apparatus. A laterally projecting cam follower 28 on the opposite end of the electrode 18 rides on a cam surface 29 of a cam 30 which is fixed to a shaft 31 and has a shoulder 32. The wire 12 of the relay component 13 and the electrode 18 are connected through conductors 34 and 35, respectively, to a source of high voltage 36.

In the operation of the apparatus, a contact 10 is placed in the notch 20 of the electrode 18 by any suitable means, and as the cam 30 rotates, the follower 28 will ride off of the shoulder 32 and the electrode 18 will be rapidly advanced by the spring 23 toward the holder 16 to carry the contact 10 into percussive engagement with the end of the wire 12. As the contact 10 moves into close proximity to the end of the wire 12, the high voltage source 36 is discharged, causing an arc to be formed between the wire 12 and the contact 10 and effect the fusing of the adjacent surfaces of the wire and the contact and the welding of the contact and the wire to each other.

As shown more clearly in Fig. 3, the notch 20 formed in the electrode 18 is defined in part by a thrusting surface 40, disposed transversely of the path of movement of the electrode 18, engageable with one face of the contact 10 to establish an electrical connection therewith and to apply a thrust thereto during the advancing movement of the electrode. A pair of gripping surfaces 42 defining opposite ends of the notch 20 of the electrode 18 extend perpendicularly to the thrusting surface 40 and engage opposite end faces of the contact 10 for releasably holding the contact on the electrode. A longitudinally disposed slot 44 in the electrode divides the forward end of the electrode into a pair of jaws 45 and 46 for yieldably gripping the contact 10 therebetween.

To prevent arcing from a misplaced wire 12 to the jaws 45 and 46 of the electrode during a welding operation, the forward exposed end surfaces 47 of the electrode are protected by blocks 48 of dielectric material. The blocks 48 are made of any suitable dielectric material, preferably porcelain, and are cemented or otherwise secured to the forward end of the jaws 45 and 46 to protect the end of the electrode 18 from damage due to arcing.

In the embodiment of the invention shown in Fig. 4, the electrode 118 has a pair of notches 147 formed therein for receiving a pair of rectangular porcelain protective blocks 148 which are suitably secured thereto. These protective blocks 148 have opposed parallel surfaces 142, portions of which extend transversely beyond end thrust surfaces 140 of the electrode and cooperate therewith to form a notch 120 for receiving and releasably holding a contact 10 therein.

In the embodiment shown in Fig. 5, the forward sloping end surfaces 247 of the electrode 218 have protector blocks 248 of porcelain or other suitable dielectric material cemented or otherwise suitable secured thereto. Opposed faces 249 of the blocks 248 are aligned and cooperate with faces 250 on the electrode 18 to form gripping surfaces on the electrode for engaging the end surfaces of the contact 10. These gripping surfaces are disposed at right angles to thrust surfaces 240 of the electrode and cooperate therewith to form a notch 220 for receiving a contact 10 therein.

From the above description, it will be seen that an improved percussion-welding electrode is provided having a thrust surface engageable with one face of the contact to be welded for establishing an electrical connection therewith and for imparting thrust thereto, a pair of spaced gripping surfaces engageable with opposite end surfaces of the contact to releasably retain the contact on the electrode, and a pair of protective elements of dielectric material secured to the end thereof on opposite sides of the contact to prevent arcing to the electrode during the welding operation.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. In a percussion-welding apparatus, a metal electrode for carrying a part to be welded along a predetermined path and having a thrust surface at one end thereof disposed transversely of the path of travel for engaging one face of the part, and a pair of elements of dielectric material cemented to said end of said electrode in spaced relation to each other for releasably holding the part therebetween in engagement with said thrust surface.

2. A percussion-welding electrode for carrying a part to be welded along a predetermined path, said electrode having a notch at one end thereof defined by a thrust surface disposed transversely of the path of travel for engaging one face of the part to establish an electrical connection therewith and a pair of spaced opposed gripping surfaces extending transversely from said thrust surface and engageable with other portions of the part to releasably hold the part, and a pair of porcelain blocks cemented to the end of the electrode on opposite sides of said notch.

3. In a percussion-welding apparatus, a metal electrode for carrying a part to be welded along a predetermined path and having a thrust surface at one end thereof disposed perpendicular to the path of travel for engaging one face of the part, and a pair of porcelain elements cemented to said one end of the electrode and having a pair of spaced opposed surfaces extending from said thrust surface of said electrode and engageable with the part for releasably holding the part therebetween.

References Cited in the file of this patent

UNITED STATES PATENTS

| | | |
|---|---|---|
| 2,110,271 | May | Mar. 8, 1938 |
| 2,200,887 | Lockwood | May 14, 1940 |
| 2,244,455 | Gengenbach | June 3, 1941 |
| 2,807,707 | Birchler et al. | Sept. 24, 1957 |